United States Patent
Liu

(10) Patent No.: US 6,487,050 B1
(45) Date of Patent: Nov. 26, 2002

(54) DISC DRIVE WITH WEAR-RESISTANT RAMP COATING OF CARBON NITRIDE OR METAL NITRIDE

(75) Inventor: Yan Liu, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/473,847

(22) Filed: Dec. 28, 1999

Related U.S. Application Data

(60) Provisional application No. 60/121,122, filed on Feb. 22, 1999.

(51) Int. Cl.$^7$ ............................. G11B 5/54; G11B 21/22
(52) U.S. Cl. .................................................. 360/254.8
(58) Field of Search ........................... 360/254.4, 254.8, 360/255.3, 255.7

(56) References Cited

U.S. PATENT DOCUMENTS

| | | | |
|---|---|---|---|
| 4,664,976 A | | 5/1987 | Kimura et al. |
| 5,110,679 A | | 5/1992 | Haller et al. |
| 5,232,570 A | | 8/1993 | Haines et al. |
| 5,408,375 A | * | 4/1995 | Asano |
| 5,455,723 A | * | 10/1995 | Boutaghou et al. |
| 5,606,056 A | | 2/1997 | Kouvetakis et al. |
| 5,618,389 A | | 4/1997 | Kreider |
| 5,650,201 A | | 7/1997 | Tompa |
| 5,652,061 A | | 7/1997 | Jeng et al. |
| 5,750,210 A | | 5/1998 | Schmidt et al. |
| 5,757,587 A | * | 5/1998 | Berg et al. |
| 5,764,437 A | | 6/1998 | Meyer et al. |
| 5,824,387 A | | 10/1998 | Boutaghou et al. |
| 5,875,072 A | | 2/1999 | Brooks, Jr. et al. |
| 5,936,788 A | | 8/1999 | Boutaghou et al. |
| 6,078,474 A | * | 6/2000 | Koyanagi et al. |
| 6,115,214 A | * | 9/2000 | Allsup et al. |
| 6,122,130 A | * | 9/2000 | Boutaghou et al. |
| 6,292,333 B1 | * | 9/2001 | Blumentritt et al. ..... 360/254.8 |

FOREIGN PATENT DOCUMENTS

| JP | 10-302421 | * 11/1998 |
|---|---|---|

OTHER PUBLICATIONS

"Plasma Surface Engineering of Metals" by, Rie et al., MRS Bulletin, Aug. 1996, pp. 46–51.

* cited by examiner

*Primary Examiner*—Craig A. Renner
(74) *Attorney, Agent, or Firm*—Westman, Champlin & Kelly, P.A.

(57) ABSTRACT

A disc drive unit includes an actuator assembly with a suspension assembly supporting a head and a ramp positioned to guide the head toward or away from a data storage surface. The head facilitates data transmission with respect to the data storage surface. The actuator assembly positions the head at selected locations along the data storage surface. In particular, the ramp surface has a carbon nitride or metal nitride material. A method is provided for applying a carbon nitride coating onto an organic polymer material. The method includes directing a nitrogen plasma at the surface of the organic polymer material.

10 Claims, 4 Drawing Sheets

DISC DRIVE WITH WEAR-RESISTANT RAMP COATING OF CARBON NITRIDE OR METAL NITRIDE

CROSS REFERENCE TO RELATED APPLICATIONS

This application claims the benefit of provisional application serial No. 60/121,122 to Liu filed Feb. 22, 1999, entitled "Intensified Plasma Nitriding Process For The Improvemet Of Ramp SURFACE'S PROPERTIES."

FIELD OF THE INVENTION

The present invention relates generally to structures, such as ramps, used to transfer a read/write head toward and away from a disc surface. More particularly, the invention relates to surface treatments of ramps used for loading and unloading heads in a data storage system, to reduce or eliminate erosion of the ramp surface.

BACKGROUND OF THE INVENTION

Disc drives are used for storing information typically as magnetically encoded data, and more recently as optically encoded data, on a disc surface. The disc spins at high rotational velocities such that the head or slider flies above the disc surface on a cushion of air. The head generally includes a transducer or focusing device for reading or writing the data or for transmitting focused light between the disc and a transducer. A suspension arm is used for radially accessing different data tracks on the rotating discs.

Generally, all hard drive discs are tested before shipment. During a glide test, the glide head or slider files over a disc surface generally at a predetermined clearance from the disc surface, known as the glide height or fly height. If contact occurs between the glide head and a disc defect or asperity, forces on the glide head create responses that can be measured with transducers mounted on or near the head. A suspension arm is used to move the glide head to test different positions on the spinning disc.

The disc stops spinning when the disc drive is turned off. When the disc is no longer spinning, the head no Longer rides on a cushion of air. Contact between the disc surface and the head can result in data loss and in damage to the head arid disc. To reduce these risks, the head can be moved to a specially prepared portion of the disc surface where the surface is treated, for example, with a special texture, to reduce damage when contacted with the head. Generally, this portion of the disc is not used for data storage. However, this reduces the storage capacity of the disc.

In some disc drives, the head is moved away from the disc when the disc is no longer spinning. These operations of moving the head away from and back to the disc surface are referred to as unloading and loading the head, respectively. Dynamic loading and unloading is used to move a head onto or off of a disc surface using a ramp. Thus, the head can be safely positioned away from the disc when the disc stops spinning. In particular, the bead is removed from the vicinity of the disc surface when the disc is spun down and return when the disc resumes spinning.

Dynamic loading/unloading provides for an improved ability of the data storage system to withstand non-operating shock, a capability to achieve storage capacity improvements, improved surface stiction, improved durability, reduced start current requirements, and enhanced power saving modes operation. An improved ability to withstand shock results from having sliders/heads that are not parked on the surface of the disc such that slider impact on the disc surface is avoided. Since texturing of the disc surface is avoided by not resting the slider on a portion of a stopped disc, smoother disc and correspondingly reduced fly heights are possible. Power saving enhancements result from an ability to power down actuator electronics while the disc pack continued to spin.

Dynamic loading/unloading involves the guidance of the head away from the disc surface by gliding the actuator arm along a ramp. Generally, the arm supporting the head comes to rest on the ramp with the slider safely away from the disc surface. However, contact between the arm and the ramp can result in wear of the ramp. Ramps have been formed from polymer materials due to manufacturing considerations and cost. The suspension assembly for the head generally includes a stainless steel dimple or the like for contacting the ramp. The contact geometry between the suspension assembly and the flat ramp produces a relatively small contact area with a correspondingly large contact stress.

Repeated sliding of the suspension assembly over the ramp surface during load/unload operations can cause a wear track and a commensurate removal of polymer material from the ramp surface. As a result, debris is generated, which may deposit at the head/disc interface. In particular, debris can accumulate on the head or disc surface to prevent proper flight, leading to abrasive wear on the head and disc surfaces. It is well known that particles can cause severe wear and even crashing of the head onto the disc surface.

The present invention provides a reduction to the debris problem and offers other advantages over the prior art.

SUMMARY OF THE INVENTION

The present invention relates to a disc drive unit with a coated load/unload ramp that resists abrasion, which greatly reduces the above-mentioned debris problem.

In accordance with one embodiment of the invention, a disc drive unit includes an actuator assembly with a suspension assembly supporting a head and a ramp positioned to guide the head toward or away from a data storage surface. The head facilitates data transmission with respect to the data storage surface. The actuator assembly positions the head at selected locations along the data storage surface. The ramp surface preferably has a compound that includes carbon nitride or metal nitride, which may be in the form of a coating.

In accordance with another embodiment, the invention pertains to a method for applying a carbon nitride onto an organic polymer material. The method includes directing a nitrogen plasma at the surface of the organic polymer material, where the organic polymer material serves as a carbon source.

These and various other features and advantages which characterize the present invention will be apparent upon reading of the following detailed description and review of the associated drawings.

DETAILED DESCRIPTION

Figure 1:
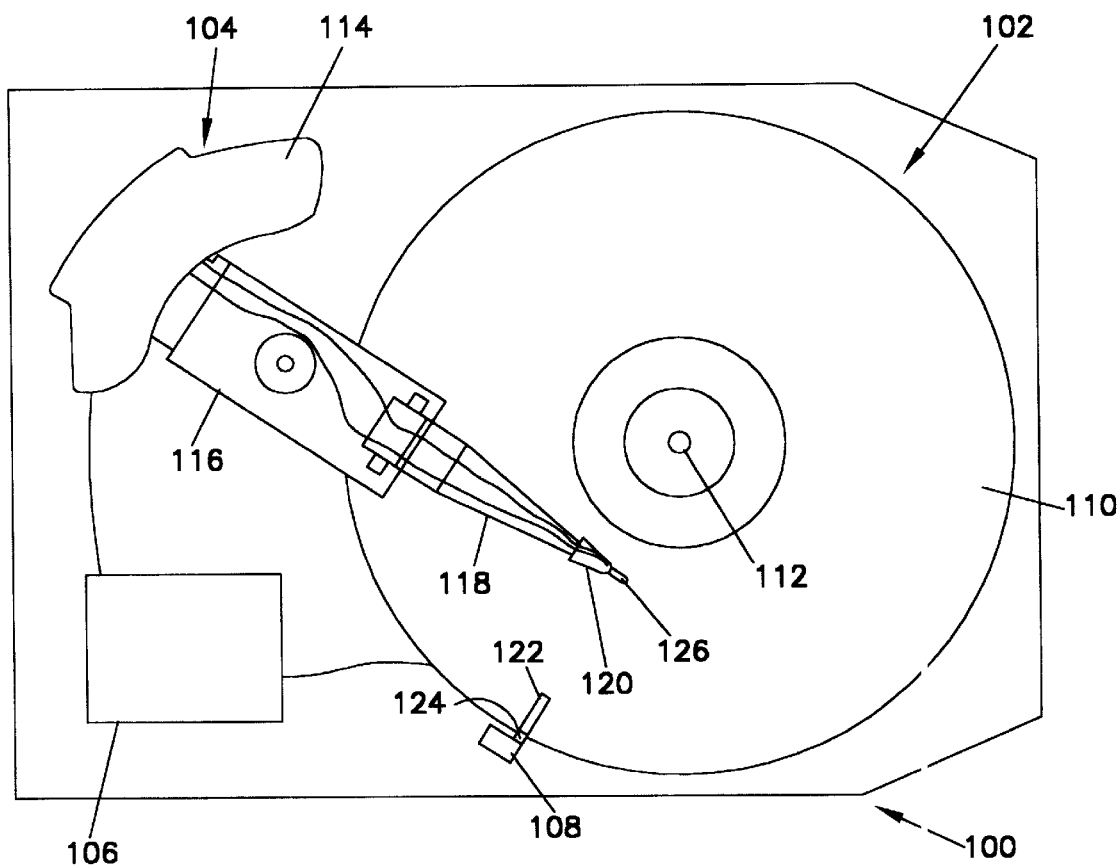
FIG. 1 is a schematic, top view of a disc drive system.

Disc drive systems that load a head onto and unload a head off from a data storage disc can incorporate a ramp with a polymer substrate and a surface having a composition with a carbon nitride or a metal nitride. The carbon nitride or metal nitride can form a coating on the polymer substrate. The carbon nitride or metal nitride is a hard material that makes the ramp abrasion resistant. By reducing abrasion of the ramp during loading and unloading operations, debris from abrasion of the ramp is reduced or eliminated.

Disc drive data storage systems can be based on, for example, magnetic, optical or magneto-optical data storage. Appropriate disc drive data storage systems can be involved in the reading and/or writing of data with respect to the disc. The data storage system can involve one or more discs, and the disc can have any shape and size, although the discs generally are round. Preferred embodiments include hard disc drives with a plurality of discs 110. In alternative embodiments, the discs within the drive unit are interchangeable.

To read and or write data with respect to the disc, a head is positioned adjacent the appropriate part of the disc to perform the operation. The head is used to transmit the data onto and/or off from the disc. To accomplish this function, the head can include a transducer such that the data is converted between an electrical signal and a storage form, such as a magnetic or optical feature associated with the disc. Alternatively, the head can include a transmitter, such as a lens or the like, that is used to transmit the local information at the disc surface to a remote transducer that forms a corresponding electrical signal.

To access desired portions of the disc, the head is mounted on a movable arm connected to an actuator. The disc generally is spun at high velocity such that the head can access any point along a circumference of the disc at a single position of the arm. Generally, the arm can be moved roughly radially along the disc surface to access data tracks along radii of the disc.

When the disc is spinning at high speeds, the head flies above the disc surface on a cushion of air. As data storage densities have been increased, fly heights, i.e., the distance from the head to the spinning disc surface have been reduced. Due to the small separations between the head and the disc, the disc drives are very sensitive to any debris becoming associated with the disc surface or the head. Any debris can lead to abrasion of the disc and/or the head, and possibly ultimately to failure of the disc drive.

When the disc drive is shut down, the disc stops spinning. When the disc is not spinning, the head would no longer ride on a cushion of air, and the head would come into contact with the disc surface. To avoid possible abrasion of the disc surface, the transducer head can be removed from the disc surface prior to or during the spinning down of the disc. This process of removing the head from the disc surface can be referred to as dynamic unloading. The process of returning the head to the vicinity of the disc, generally when the disc is spinning, is referred to as dynamic loading.

A structure is needed to guide the head away from the disc surface and back to the disc surface. This structure is called a ramp and generally involves and incline such that the head is raised relative to the disc surface. The ramp generally contacts a specific portion of the movable arm.

To reduce abrasion of the ramp surface due to contact with the arm, the ramp surface is associated with a carbon nitride. Ramps generally have been formed from polymer materials. The carbon nitride can be deposited directly onto the polymer surface. The properties of the resulting carbon nitride coating generally depends on the deposition approach. In preferred embodiments, the carbon nitride is directly bonded to the polymer surface. Similarly, a metal nitride can be sputter deposited onto a polymer substrate.

The carbon nitride or metal nitride deposition generally involves vapor phase deposition under vacuum. A preferred approach to the deposition of the carbon nitride coating involves a plasma nitriding system. The plasma deposition generates reactive nitrogen containing species that react with the polymer surface. The carbon nitride is formed from the reactive nitrogen species and the organic polymer species. The resulting carbon nitride is covalently bonded to the underlying polymer substrate. Due to the covalent bonding, the carbon nitride layer is highly resistant to delamination from the polymer surface.

The carbon nitride and metal nitride materials are very hard and, therefore, abrasion resistant. Due to the abrasion resistance of the carbon nitride and metal nitride materials, debris resulting from abraded ramp material is reduced or eliminated. The reduction of debris from the ramp correspondingly reduces disc and/or head wear and the risk of disc failure due to a head crash. Furthermore, the ramp becomes more durable, and the loading and unloading operation becomes more consistent with the passage of time.

1. Disc Drive Apparatus

Referring now to FIG. 1, a disc drive system 100 is shown. A disc drive system, like the one shown in FIG. 1, generally includes drive unit 102, actuator assembly 104, controller 106 and ramp 108. Drive unit 102 includes disc or a plurality of discs 110 and spindle 112 connected to a spindle motor. In the embodiment shown, actuator assembly 104 includes actuator 114, support arm 116, load beam or suspension assembly 118 and head 120. Actuator 114 controls the position of head 120 over disc 110 by rotating or laterally moving support arm 116. Suspension assembly 118 is extends from support arm 116 and head 120 is located at or near the end of suspension assembly 118. Controller 106 instructs actuator 114 regarding the position of support arm 116 over disc 110 and drive unit 102 regarding the control of the spindle motor. Ramp 108 generally includes a sloped portion 122 and a flat portion 124.

Head 120 includes a slider/head which, in operation, flies just above the disc surface. The slider includes an air bearing surface that is contoured to achieve the desired aerodynamic performance of the head when the head is flying over the rotating disc surface. The head generally includes transmitters, transducers, or lenses, used to read/write data from/to the disc.

Ramp 108 is used for the loading and unloading of the head relative to a position adjacent the disc surface. To this end, ramp 108 generally includes sloped portion 122 that functions to change the height of the head relative to the plane of the disc surface. Ramp 108 generally contacts a portion of suspension assembly 118 or head 120 during the load and unload operations. Suspension assembly 118 or head 120 generally include a contact area 126 for contacting the ramp surface. The characteristics of contact area 126 depend on the particular design features of ramp 108 and actuator assembly 104. This contact between ramp 108 and contact area 126 can lead to friction on the surface of ramp 108.

Ramp 108 can have one of a variety of designs to function adequately in the load and unload operations. The specific design of ramp 108 will depend on the design of the corresponding structure on the actuator assembly 104 since ramp 108 should contact a selected portion of suspension assembly 118 or head 120 to reduce the risk of causing damage. Two specific designs for ramp 108 are discussed in detail below.

Figure 2:
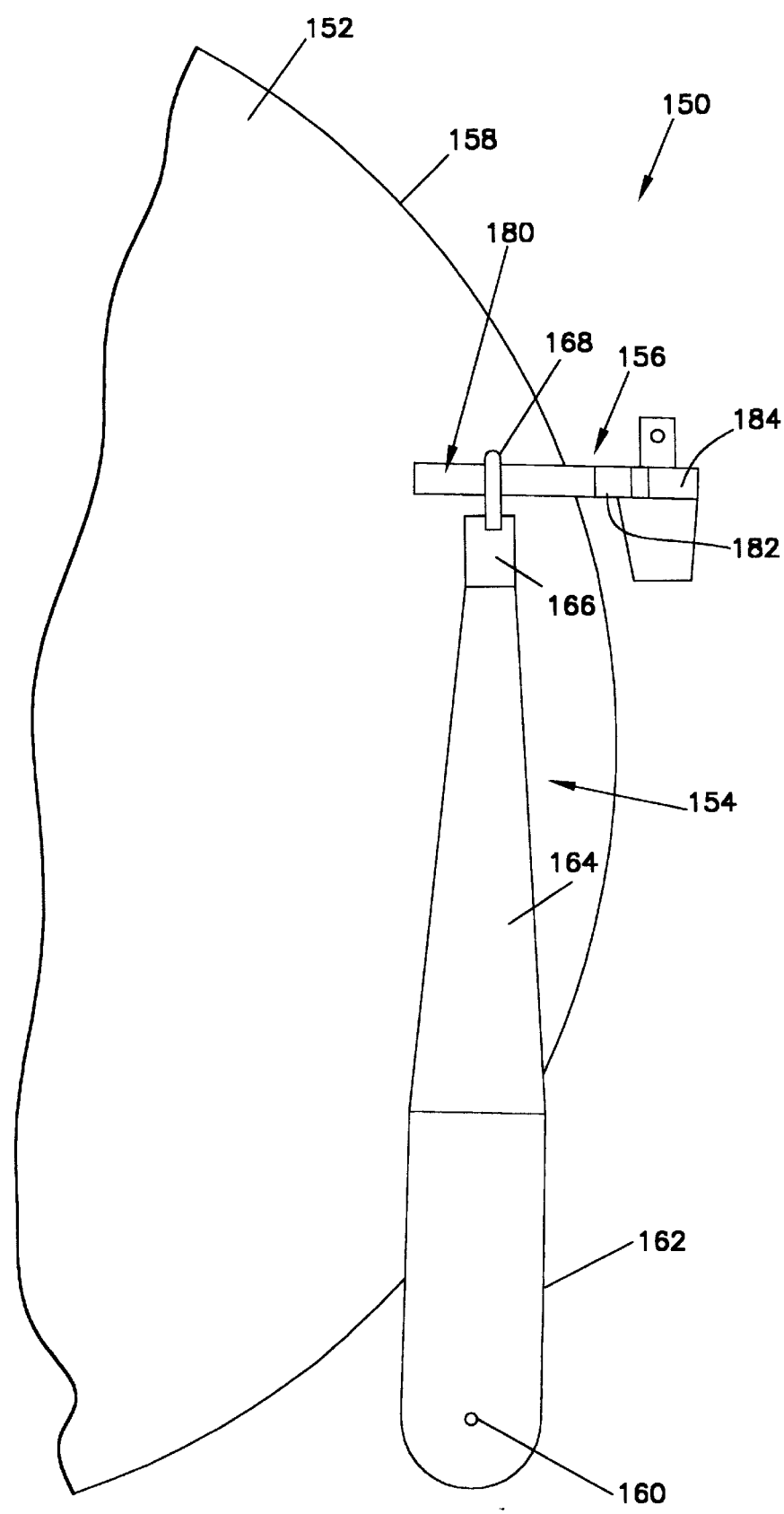
FIG. 2 is a top view of a disc drive data storage system that uses a stationary ramp for dynamic loading and unloading of an actuator assembly carrying a slider.

Referring to FIG. 2, one embodiment of a data storage system having a stationary ramp for loading and unloading a slider carrying an actuator. Data storage system 150 includes a data storage disc 152, actuator assembly 154 and stationary ramp 156. Data storage disc 152 has an edge 158. Actuator 154 includes pivot 160, base portion 162, load beam 164, slider carrying gimble/head assembly 166 and unloading tab or contact area 168. Unloading tab 168 is attached to gimble/head assembly 166 and extends away from load beam 164. as shown in FIG. 2.

Stationary ramp 156 includes a sloped region 180 that forms an angle with respect to a plane parallel to disc 152, i.e., a plane parallel to the plane of the page of the figure, such that the height of the sloped region 180 increased toward edge 158 of disc 152. Stationary ramp 156 also has a level region 182 adjacent to sloped region 180 for supporting actuator assembly 154 in its fully unloaded position. Stationary ramp 156 further includes a support base 184.

Actuator 154 is "unloaded" by rotating the actuator horizontally about pivot 160 toward edge 158 of disc 152 until unloading tab 168 comes into contact with sloped region 180 of ramp 156. Continued horizontal rotation of actuator 154 toward edge 158 moves tab 168 up sloped region 180 to a fully unloaded position on level region 182 of ramp 156. From a resting position on level region 182 of ramp 156, actuator 154 is "loaded" by rotating actuator 154 about pivot 160 toward disc 152 until tab 168 is clear of ramp 156.

Figure 3:
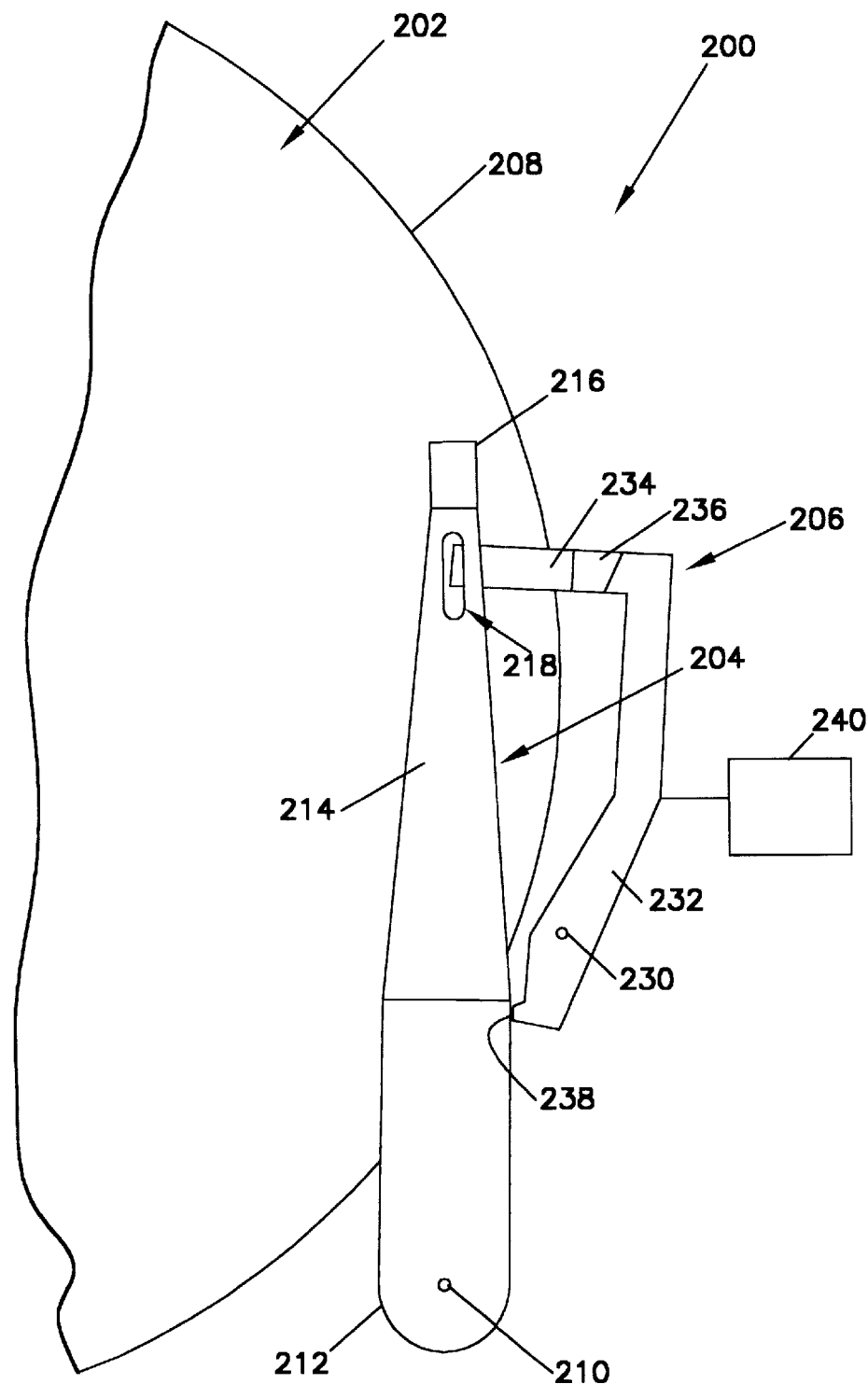
FIG. 3 is a top view of an alternative embodiment of a disc drive data storage with a pivoting ramp for dynamic loading and unloading of an actuator assembly carrying a slider.

Referring to FIG. 3, an alternative embodiment of a disc drive data storage system is shown having a pivoting ramp for the dynamic loading and unloading of the actuator assembly. Data storage system 200 includes disc 202, actuator assembly 204 and ramp assembly 206. Disc 202 has an outer edge 208. Actuator 204 includes pivot 210, base plate 212, load beam 214, slider carrying gimble/head assembly 216 and unloading button or contact area 218. Load beam 214 extends from base plate 212, and gimble/head assembly 216 extends from load beam 214. Unloading button 218 is coupled to or formed integrally with the bottom side facing disc 202 of load beam 214 or to the gimble/head assembly 216.

Pivoting ramp 206 includes pivot 230, pivot arm 232, sloped region 234, level region 236, lower extension 238, and ramp bias device 240. Pivot 230 is a low friction axis that, in preferred embodiments, includes a clearance hole in the ramp material with a pin fastened to the upper and lower covers along with a small thrust bearing. A variety of alternative bearing structures can be used for pivot 230.

Level region 236 extends from pivot arm 232. In alternative embodiments, pivot arm 232 functions as level region 236 such that a separately identifiable level region is not needed. Sloped region 234 forms an angle with respect to a plane parallel to the plane of disc 202 such that the height of sloped region 234 increases toward level region 236. Sloped region 234 can have multiple slopes at different positions relative to level region 236.

Ramp bias device 240 can be any of a variety of devices or mechanisms for biasing pivoting ramp 206 away from disc 202. Rotation of disc 202 causes airflow that also tends to bias pivoting ramp 206 away from disc 202. If necessary, additional bias can be supplied by ramp bias device 240, which can be a mechanical spring or the like. In preferred embodiments, the biasing forces are carefully balanced. If the biasing forces are insufficient, ramp 206 may stay in a position rotated toward disc 202 after the slider is loaded, which could cause the slider to unload from the disc before reaching data tracks near edge 208. Also, if the bias forces are too great, ramp 206 may not stay in the proper loading position during the load of the slider onto the disc. To help obtain the desired degree of balance, a very low friction pivot 230 can be used, such that hysteresis is reduced, and a small bias force can be used such that the bias forces are easily overcome by the forces exerted by actuator 204 during loading.

When actuator 204 is loaded such that the head is positioned to interact with the disc surface, ramp 206 is biased away from disc 202. During an unload operation, rotation of actuator 204 results in actuator 204 engaging lower extension 238 of ramp 206 causing the rotation of ramp 206 to extend sloped region 234 further over disc 202. As actuator 204 continues to rotate unloading button 218 toward edge 208 of disc 202 and ramp 206 rotates toward disc 202, the unload takes place. Eventually, unload button 218 comes to rest on level region 236.

For a load operation, actuator 204 is rotated toward the center of disc 202. In preferred embodiments, the frictional sliding of button 218 on ramp 206 creates a force sufficient to overcome the bias force provided by air circulation caused by disc 202 and by bias device 240. Thus, ramp 206 remains positioned extending over disc 202 until actuator 204 becomes disengaged from ramp 206. Then, the forces provided by bias device 240 return ramp 206 to a position deflected away from disc 202. The structure and advantages of the embodiment of the ramp shown in FIG. 3 is described further in U.S. Pat. No. 5,764,437 to Meyer et al.

Note that in the operation of either disc drive system of FIGS. 2 and 3, the loading and unloading operations involve direct contact with the ramp surface. Thus, the ramp surface is prone to wear.

2. Nitride Deposition

Figure 4:
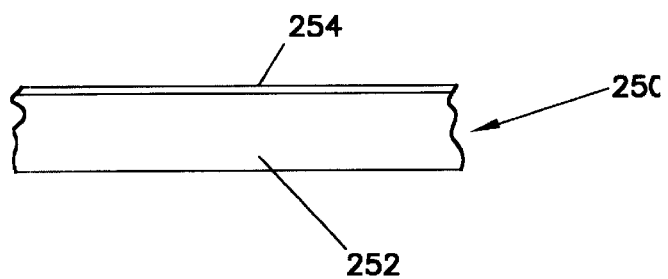
FIG. 4 is a fragmentary, sectional view of a substrate with a carbon nitride or metal nitride coating.

A schematic cross sectional view of the ramp is shown in FIG. 4. Ramp 250 includes a polymer substrate 252 and a carbon nitride or metal nitride material at ramp surface 254. A covalent bond 253 couples the ramp surface 254 to the substrate 252. The nitride materials can be in the form of a coating. As noted above, the shape and size of ramp 250 will depend on the design of the ramp and the corresponding structure on the suspension assembly for contacting the ramp. In preferred embodiments, the carbon nitride coating covers at least the portion of the ramp surface that contacts the suspension assembly during load and unload operations. The carbon nitride material can cover the entire top ramp surface. To perform the deposition process, the polymer substrate is mounted with at least a portion of the surface exposed. The exposed portion of the surface can be treated to deposit carbon nitride or metal nitride.

Suitable polymers for the ramp include rigid polymers that can tolerate the forces to which the ramp is subjected during the load and unload operations. Preferred polymers are organic polymers, such that covalent bonds are formed with carbon nitride.

If the nitride material is in the form of a coating, the carbon nitride or metal nitride coating has an average thickness from about 10 nanometers (nm) to about 5 microns, preferably from about 25 nm to about 3 microns, and more preferably from about 40 nm to about 2 micron. In preferred embodiments, the carbon nitride material is covalently bonded to the polymer substrate. Generally, the nature of the carbon nitride material depends on the processing approach used to apply the coating. The carbon nitride material can have a composition covering a wide range of carbon nitride materials with a formula $c_xN_y$.

Generally, the carbon nitride has at least about 10 atomic percent nitrogen. This ratio can be determined by an Auger analysis. The ratio of carbon to nitrogen in the carbon nitride layer, i.e., x/y, generally is no more than about 9:1, preferably no more than about 3:1, and more preferably from about 2:1 to about 3:4. Crystalline carbon nitride are known with stoichiometries of $C_3N_4$ and either $\alpha$ or $\beta$ crystal structures. These crystalline materials are described in detail in U.S. Pat. No. 5,110,679 to Haller et al. Also, a variety of amorphous carbon nitride materials are known. Generally, all of the carbon nitride materials are very hard, although the crystalline $\beta$-$C_3N_4$ materials are extremely hard.

Several processes are known for the application of carbon nitrides and metal nitrides. In particular, physical vapor deposition and chemical vapor deposition can be used. These deposition approaches can be enhanced by plasma techniques and ion-assisted techniques. In a simple vapor deposition approach, carbon or metal is radio frequency (RF) sputtered in a nitrogen atmosphere. Carbon nitride or metal nitride is deposited on the heated (50° C. to 250° C.) surface of a substrate. The amount of nitrogen in the resulting coating is determined in part by the amount of nitrogen in the atmosphere and by the sputtering power. The nitrogen pressure generally ranges from about 5 mTorr to about 40 mTorr.

The use of direct current (DC) sputtering to apply a carbon nitride coating to a magnetic disc is described in U.S. Pat. No. 4,664,976 to Kimura et al. Similarly, the use of DC magnetron sputtering to coat a magnetic disc surface with carbon nitride is described in U.S. Pat. No. 5,232,570 to Haines et al. The production of crystalline $\beta$-$C_3N_4$ using sputtering is described in U.S. Pat. No. 5,110,679 to Haller et al.

In an alternative approach, an ion beam is used to supply high kinetic energy nitrogen atoms. These are combined with sputtered carbon atoms. The process is performed at very low pressures, less than about 2.5 Pa. Ion bombardment of nitrogen gas produces the nitrogen atom beam. DC or RF magnetron sputtering is used. This process is described further in U.S. Pat. No. 5,618,389 to Kreider.

Plasma assisted deposition with a beam of C ions and an intersecting beam of nitrogen containing radicals is described in U.S. Pat. No. 5,650,201 to Tompa. The two beam intersect at the surface of the substrate to be coated. The carbon negative ion beam is created by the decomposition of a hydrocarbon. Suitable nitrogen radicals include, for example, radicals of $N_2$ and $NH_3$. In addition, microwave plasma deposition has been used to deposit crystalline $\beta$-$C_3N_4$, as described in U.S. Pat. No. 5,652,061 to Jeng et al.

The approaches described above can be adapted for the application of carbon nitride or metal nitride materials to a polymer substrate. Some plasma and ion beam approaches are advantageous because the substrate does not have to heated significantly to form the carbon nitride coating. This can be advantageous for polymer substrates, which may be heat sensitive. For organic polymers, the substrate itself can supply the carbon atoms, so that the carbon source in the above techniques maybe can be eliminated or its contribution reduced.

Figure 5:
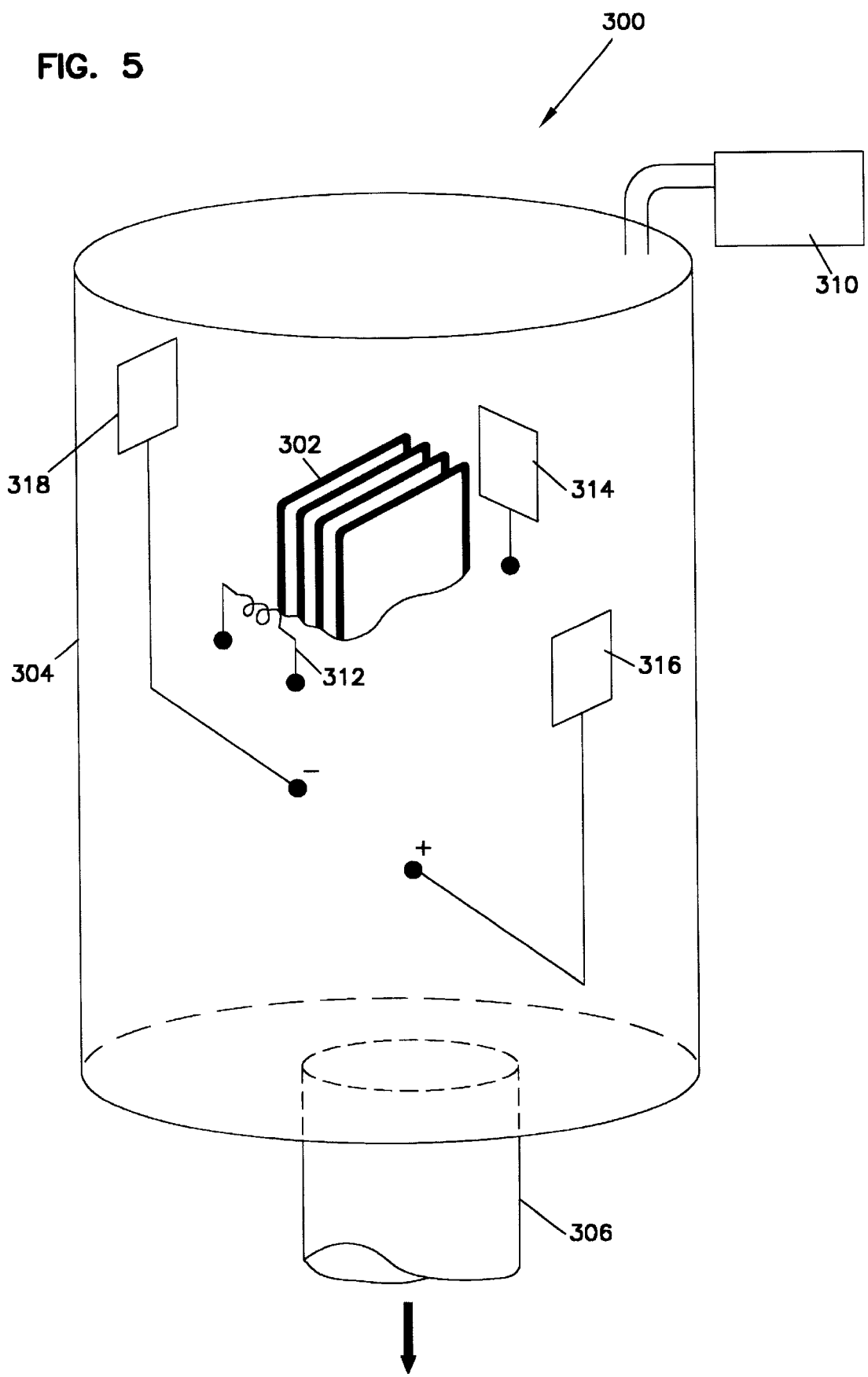
FIG. 5 is a schematic, perspective view of a plasma deposition apparatus for the deposition of carbon nitride on an organic polymer substrate using a nitrogen plasma.

A preferred apparatus for the deposition of carbon nitride onto an organic polymer substrate is shown in FIG. 5. Apparatus 300 includes a substrate 302 mounted within a vacuum chamber 304. Vacuum chamber 304 includes a vent 306 connected to a pump and a connection to a nitrogen gas source 310. The gas source can also introduce an inert gas, such as argon, mixed with the nitrogen gas. Filament 312 produces an electron beam that is directed to anode plate 314. The electron beam generates a nitrogen plasma created from the nitrogen gas. Plates 316, 318 have a charge bias that is used to control the nitrogen plasma. The nitrogen plasma impinging on the organic polymer substrate generates the carbon nitride.

In summary, one aspect of the invention pertains to a disc drive unit 100 including an actuator assembly 104 with a suspension assembly 118 supporting a head 120 and a ramp 108, 156, 206 positioned to guide head 120 toward or away from a data storage disc 110. Head 120 facilitates data transmission with respect to data storage disc 110. Actuator assembly 104 positions head 120 at selected locations along data storage disc 110. In particular, the ramp surface 254 has a carbon nitride or metal nitride material.

Ramp 108, 156, 206 generally has a sloped region 122, 180, 234 and a flat region 124, 182, 236. Ramp 108, 156, 206 generally includes a polymer with, preferably, a carbon nitride coating covering at least a portion of the.ramp surface. The carbon nitride preferably is covalently bonded to the polymer. The carbon nitride coating, in preferred embodiments, has an average thickness from about 10 nanometers to about 5 microns and more preferably from about 50 nanometers to about 2 microns. The carbon nitride preferably includes at least about 10 atomic percent nitrogen.

Actuator assembly 104 generally has a contact area 126, 168, 218 for contacting ramp 108, 156, 206. The portions of ramp surface 254 that meet contact area 126, 168, 218 preferably have a carbon nitride or metal nitride material. In some embodiments, the entire top ramp surface has a carbon nitride material.

Data storage unit 100 can be a hard disc drive comprising a plurality of fixed discs 110. Data storage unit 100 can include an optical or magneto-optical storage disc. Head 120 of data storage unit 100 generally includes a structure to facilitate data transfer, such as a transducer or a lens.

In another aspect, the invention relates to a method for applying a carbon nitride material onto an organic polymer material. The method includes mounting the organic polymer material such that at least a portion of its surface is exposed. The method further involves directing a nitrogen plasma at the exposed surface of the organic polymer material, where the organic polymer material serves as the carbon source. The nitrogen plasma can be formed with an ion beam in a nitrogen atmosphere. The carbon nitride coated polymer can be formed into ramp 108, 156, 206 for a disc drive unit 100.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the load/unload ramp while maintaining substantially the same functionality without departing from the scope and spirit of the present invention. In addition, although the preferred embodiment described herein is directed to a load/unload ramp for a disc drive system, it will be appreciated by those skilled in the art that the teachings of the present invention can be applied to other systems, like asperity detection apparatuses and compact disc readers, without departing from the scope and spirit of the present invention.

What is claimed is:

1. A disc drive data storage unit comprising:

an actuator assembly comprising a suspension assembly supporting a head that facilitates data transmission, wherein the actuator assembly positions the head at selected locations; and a stationary ramp positioned to guide the head toward or away from a data storage disc, the ramp comprising a polymer, a ramp surface which coats the polymer comprising a composition, the composition comprising carbon nitride or metal nitride, the ramp spaced apart from the data storage disc proximate an outer radius of the disc.

2. The data storage unit of claim 1 wherein the ramp comprises a sloped region and a flat region.

3. The data storage unit of claim 1 wherein the carbon nitride or metal nitride comprises carbon nitride.

4. The data storage unit of claim 3 wherein the carbon nitride has an average thickness from about 50 nanometers to about 2 microns.

5. The data storage unit of claim 3 wherein the carbon nitride has an average thickness from about 10 nanometers to about 5 microns.

6. The data storage unit of claim 1 wherein the actuator assembly comprises a contact area for contacting the ramp.

7. The data storage unit of claim 6 wherein the entire top ramp surface has a carbon nitride material.

8. The data storage unit of claim 6 wherein portions of the ramp surface that contact the contact area have a carbon nitride or metal nitride material.

9. The data storage unit of claim 1 wherein the storage disc comprises an optical or magneto-optical storage disc.

10. The data storage unit of claim 1 wherein the metal nitride or carbon nitride comprises carbon nitride and wherein the carbon nitride comprises at least about 10 atomic percent nitrogen.

* * * * *